US008688679B2

(12) United States Patent
Lalji et al.

(10) Patent No.: US 8,688,679 B2
(45) Date of Patent: Apr. 1, 2014

(54) COMPUTER-IMPLEMENTED SYSTEM AND METHOD FOR PROVIDING SEARCHABLE ONLINE MEDIA CONTENT

(75) Inventors: Alkarim "Al" Lalji, Bothell, WA (US); Murugesan Ganesan, Bothell, WA (US); Charles Finkelstein, Woodinville, WA (US)

(73) Assignee: Smartek21, LLC, Kirkland, WA (US)

( * ) Notice: Subject to any disclaimer, the term of this patent is extended or adjusted under 35 U.S.C. 154(b) by 301 days.

(21) Appl. No.: 13/186,348

(22) Filed: Jul. 19, 2011

(65) Prior Publication Data

US 2012/0023084 A1    Jan. 26, 2012

Related U.S. Application Data

(60) Provisional application No. 61/366,077, filed on Jul. 20, 2010.

(51) Int. Cl.
*G06F 17/30* (2006.01)

(52) U.S. Cl.
USPC .......................... 707/707; 707/756; 707/803

(58) Field of Classification Search
USPC .......... 707/804, 803, 702, 752, 707, 708, 756
See application file for complete search history.

(56) References Cited

U.S. PATENT DOCUMENTS

| 6,850,252 | B1 | 2/2005 | Hoffberg |
| 7,222,163 | B1 | 5/2007 | Girouard et al. |
| 7,260,564 | B1 | 8/2007 | Lynn et al. |
| 7,334,017 | B2 | 2/2008 | Hawkes et al. |
| 7,401,097 | B1 | 7/2008 | Baer et al. |
| 7,627,810 | B2 | 12/2009 | Glazer et al. |
| 7,644,103 | B2 | 1/2010 | Smith et al. |
| 7,974,714 | B2 | 7/2011 | Hoffberg |
| 7,996,431 | B2 * | 8/2011 | Coffman et al. ............... 707/796 |
| 8,015,159 | B2 | 9/2011 | Boicey et al. |
| 8,055,688 | B2 * | 11/2011 | Giblin ........................... 707/804 |
| 8,089,507 | B2 * | 1/2012 | Ikeda et al. ..................... 348/43 |

(Continued)

OTHER PUBLICATIONS

Microsoft TechNet, "Tune relevance factors (FAST Search Server 2010 for SharePoint)," http://technet.microsoft.com/en-us/library/ff453902.aspx (first published on May 12, 2010, updated on Feb. 10, 2011).

(Continued)

*Primary Examiner* — Debbie Le
(74) *Attorney, Agent, or Firm* — Patrick J. S. Inouye; Krista A. Wittman; Makiko Coffland (57) ABSTRACT

A computer-implemented system and method for providing searchable online media content is provided. A data store is maintained through an online media server. Media content, including device-playable data provided for dynamic online use, is stored. Media metadata, including markers synchronized to sections of the device-playable data, is also stored. The media content and media metadata are functionally combined through a layered network architecture. The data store is provided as a data layer. Applications are provided within a client layer that execute on a client interconnected to the network. Service interfaces are provided within a data access layer, which are each accessible by at least one of the applications. The media content and the media metadata are combined in response to a request received through a service interface from one of the applications. The combined media content and media metadata are served to the requesting application including streaming the device-playable data.

17 Claims, 7 Drawing Sheets

(56) References Cited

U.S. PATENT DOCUMENTS

| | | | |
|---|---|---|---|
| 8,117,064 B2 | 2/2012 | Bourne et al. | |
| 8,117,185 B2* | 2/2012 | Franks et al. | 707/713 |
| 8,185,543 B1* | 5/2012 | Choudhry et al. | 707/767 |
| 8,230,343 B2 | 7/2012 | Logan et al. | |
| 2002/0120925 A1 | 8/2002 | Logan | |
| 2003/0093790 A1 | 5/2003 | Logan et al. | |
| 2004/0261027 A1 | 12/2004 | Dillon et al. | |
| 2005/0097440 A1 | 5/2005 | Lusk et al. | |
| 2005/0198006 A1 | 9/2005 | Boicey et al. | |
| 2007/0203945 A1 | 8/2007 | Louw | |
| 2007/0204285 A1 | 8/2007 | Louw | |
| 2007/0250901 A1 | 10/2007 | McIntire et al. | |
| 2007/0282818 A1 | 12/2007 | Lynn et al. | |
| 2007/0282819 A1 | 12/2007 | Lynn et al. | |
| 2008/0052739 A1 | 2/2008 | Logan | |
| 2008/0141307 A1* | 6/2008 | Whitehead | 725/46 |
| 2009/0112864 A1 | 4/2009 | Raichelgauz et al. | |
| 2009/0205000 A1 | 8/2009 | Christensen et al. | |
| 2009/0216742 A1* | 8/2009 | Coffman et al. | 707/5 |
| 2009/0228492 A1* | 9/2009 | Valdez et al. | 707/10 |
| 2009/0254578 A1 | 10/2009 | Hall | |
| 2009/0327848 A1 | 12/2009 | Glazer et al. | |
| 2010/0010968 A1 | 1/2010 | Redlich et al. | |
| 2010/0146009 A1* | 6/2010 | Kandekar et al. | 707/803 |
| 2012/0062711 A1* | 3/2012 | Ikeda et al. | 348/51 |
| 2012/0275765 A1* | 11/2012 | Ikeda et al. | 386/241 |

OTHER PUBLICATIONS

Kumar, Jayant, "Document Scoring/Calculating Relevance in Lucene," http://jayant7k.blogspot.com/2006/07/document-scoringcalculating-relevance_08.html (Jul. 8, 2006).

Sun et al., "Relevance Search and Anomaly Detection in Bipartite Graphs," ACM SIGKDD Explorations Newsletter, vol. 7, iss. 2, pp. 48-55 (Dec. 2005).

Solution Watch, "Viddler enhance your videos with timed tagging," http://www.solutionwatch.com/539/viddler-enhance-your-videos-with-timed-tagging/ (Jan. 4, 2007).

* cited by examiner

SEARCH RESULTS PAGE

Enter your search term (for e.g. windows workflow foundation)

39 min 20 s in...     43 min 30 s in...

"... ahead and put my downloads folder and database we will of install the sql server 2005 report added..."

Click here to go to the original video tape.

Video: Use ASP.NET AJAX cascading Drop Down Control to Access a Database    *Presenter: Joe Stanger*

11 min 50 s in...

"... sql statements and events tab get rid of the additional code generation in which music report builder were interested in the callers table..."

Click here to go to the original video tape.

Video: Getting started with reporting services    *Presenter: Bob Tabor*

9 min 40 s in...

"... after connecting to our instance of sql server express the configure report server utility will show us which..."

Click here to go to the original video tape.

COMPUTER-IMPLEMENTED SYSTEM AND METHOD FOR PROVIDING SEARCHABLE ONLINE MEDIA CONTENT

CROSS-REFERENCE TO RELATED APPLICATION

This non-provisional patent application claims priority under 35 U.S.C. §119(e) to U.S. Provisional Patent Application, Ser. No. 61/366,077, filed Jul. 20, 2010, the disclosure of which is incorporated by reference.

FIELD

This invention relates in general to online media content management and, in particular, to a system and method for providing searchable online media content.

BACKGROUND

Over the last few decades, digital data communication networks have evolved from simple local area networks that only interconnected computers within an office environment to wide area networks operating on a worldwide scale. Today, the most widely used public data communications network is pejoratively called the "Internet," although the term is sometimes confused with the Worldwide Web ("Web"), which refers to the set of hyperlinked documents and related resources available over the Internet, as well as other network portals.

The Internet is accessible through numerous wired and wireless network interfaces, the latter of which has undergone significant recent evolution as the capabilities of portable digital data processing and communications devices, such as smart mobile telephones, portable digital assistants, digital media players, and wireless tablet computers, have grown. And with the increased ubiquity of wireless digital data communications, access to an increasingly voluminous compendium of online content, including both traditional textual materials and audio and visual media, has become possible by a larger base of end users.

Video content available online, especially over the Internet, has appealed to an especially wide audience, from individuals to businesses and organizations, due to the breadth of subject matter that can be presented. For example, network and cable television programming and commercial movies are now offered through Web-based services, such as Hulu and Netflix. As well, video-sharing Web sites, such as YouTube and Yahoo! Video, allow end users to freely upload, share, and view video content. Similarly, popular social networking Web sites, such as MySpace and Facebook, tie in with video content sharing and viewing.

In a business environment, online video content has many uses with applicability in wide ranging fields, including e-learning, research, entertainment, corporate knowledge, surveillance, and user-generated content. Web casting, that is, streaming video or audio media delivery to an online viewing or listening audience, and Web conferencing, which transacts many-to-many real time communication, are currently the most popular business applications of online video content. However, video content has recently begun playing an increasingly important role in marketing and advertising, employee and customer training, and internal and external communications.

Nevertheless, despite the breadth of video content subject matter and applicability of use in business and other endeavors, challenges remain. For instance, video, audio, or other forms of multimedia content are only partially "visible" to conventional search engines, which are typically limited to indexing any metadata, such as title or description, that happens to accompany the video content. Similarly, video content is ordinarily treated as a closed box within which end users must manually navigate to find a desired spot. Only high level tables of content, such as found with movie video content, partially facilitate internal navigation, but only to the extent of selecting enumerated chapters, after which the end user must manually navigate through the video content until the desired spot is found. On the same note, current online video content tools lack the convenience of providing ad hoc book marks of individual scenes. Instead, end users must clumsily note the time within the video content that a desired scene appears during playback, after which the time is shared with other users who must manually fast forward their video media players to the time indicated.

Therefore, a need remains for supplementing online media content, particularly video and audio content, with searching and marking features that facilitate searching and browsing through Web search engines and usability and sharing by end users.

SUMMARY

One embodiment provides a system and method for managing video content. Sections within the video content can be temporally marked and annotated with a title and description. "Snippets" of transcripts can also be synchronized to the annotated sections. Both the annotations and snippets can be associated with sharable and searchable Uniform Resource Locators (URLs). A media player is provided with the capability of searching within video content being played, and end users are able to attach ad hoc bookmarks to sections or locations within the video content. In a further embodiment, online video metrics or analytics can be collected to track and analyze usage patterns at the Web site and Web page levels.

One embodiment provides a computer-implemented system and method for providing searchable online media content. A data store is maintained through a media server that is accessible online over a data communications network. Media content, including device-playable data provided for dynamic online use through remote streaming over the network, is stored. Media metadata, including markers synchronized to sections of the device-playable data, is also stored. The media content and the media metadata are functionally combined through a layered network architecture. The data store is provided as a data layer of the network architecture. Applications are provided within a client layer of the network architecture that execute on a client interconnected to the network. Service interfaces are provided within a data access layer of the network architecture, which are each accessible by at least one of the applications. The media content and the media metadata are combined in response to a request received through a service interface from one of the applications. The combined media content and media metadata are served to the requesting application including streaming the device-playable data.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the

DETAILED DESCRIPTION

Figure 1:
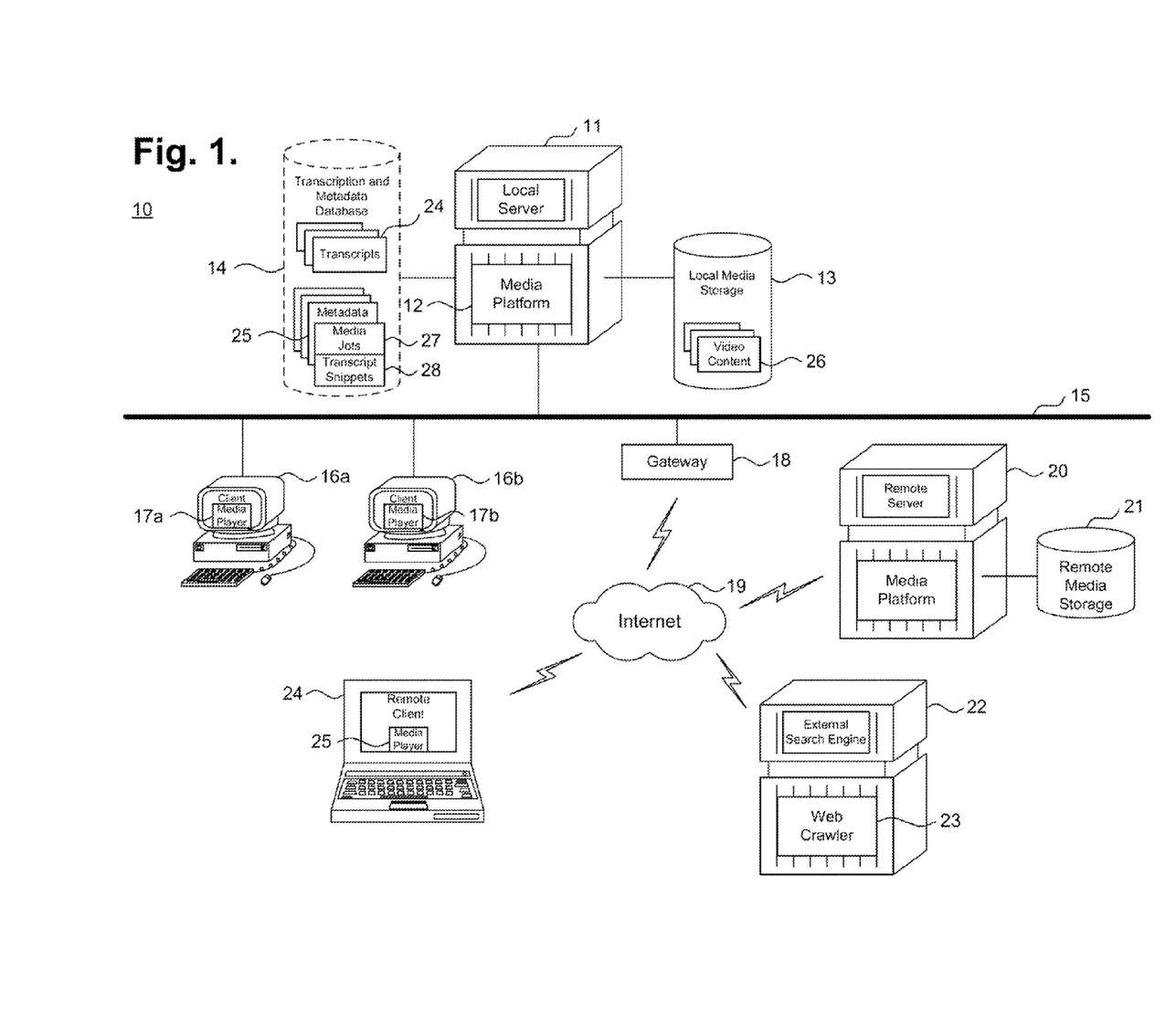
FIG. 1 is a block diagram showing an exemplary environment for providing searchable online media content.

Online video content, as well as other types of audio and visual media, can be shared, viewed, and managed by end users interconnected through a network. FIG. 1 is a block diagram 10 showing an exemplary environment 10 for providing searchable online media content. Although described herein with reference to a typical business enterprise environment, the use and management of video content is applicable to any form of networked computing environment for all manner of end users.

A typical enterprise environment includes both local enterprise components operating within the confines of a corporate intranetwork 15, and outside components operating remotely over an internetwork 19, such as the Internet, through, for instance, a gateway 18. Enterprise components include servers 11 and clients 16a, 16b that are assigned to users in different areas of responsibility within a company. Outside components similarly include remote servers 20, 22 and remote clients 24, which collaboratively interface with the enterprise components. Server functionality may be provided through a single physical server system, or by a combination of distributed server systems that can be situated both within and outside of the intranetwork 15. Other types of enterprise and outside components could also be a part of the enterprise environment. The servers 11, 20, 22 and clients 16a, 16b, 24 include hardware components conventionally found in general purpose programmable computing devices, such as a central processing unit, memory, input/output ports, network interfaces, and non-volatile storage, and execute software programs structured into routines, functions, and modules for execution on the various systems.

For purpose of facilitating video content usability and sharing, the local enterprise components include a local server 11 that is coupled to a local media storage 13 (not shown), within which video content 26, as well as other forms of audio and visual media, are maintained. The video content 26 is accessible by both local clients 16a, 16b operating within the intranetwork 15 and remote clients 24 operating over the internetwork 19. As well, a remote server 20 operating over the internetwork 19 is coupled to a remote media storage 21, within which additional video content 26, as well as other forms of audio and visual media, can be maintained for both retrieval and storage into the local media storage 13 by the local server 11, and for remote sharing and viewing by the local clients 16a, 16b.

The local server 11 and the remote server 20 access a transcription and metadata database 14 when accessing, playing, or searching the video content 26. The local server 11 is coupled to the transcription and metadata database 14, which stores the transcripts 24 of and metadata 25 for video content 26 in the local media storage 13 and remote media storage 21. The transcription and metadata database 14 can be accessed by the local server 11, remote server 20, and clients 16a, 16b, 24. However, access is read-only and copying or modification of the transcription and metadata are disallowed. In one embodiment, the transcription and metadata database 14 is implemented using SQL Server 2008, Enterprise Edition, licensed by Microsoft Corporation, Redmond, Wash. Other forms of structured relational databases could be used.

Figure 2:
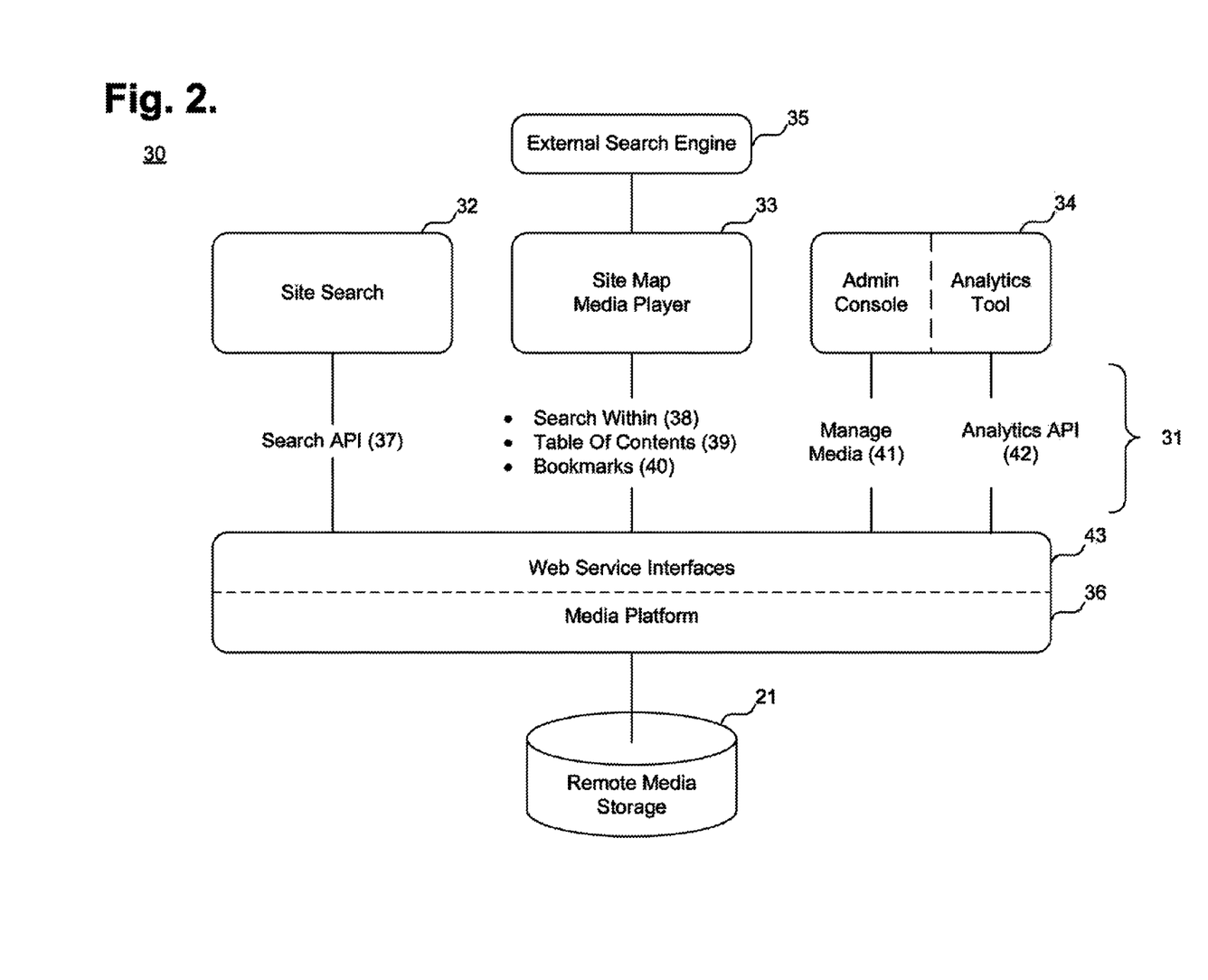
FIG. 2 is a functional block diagram showing a process flow for the components of FIG. 1.

The local server 11 stores and executes one or more media server applications collectively referred to as a media platform 12, as further described below beginning with reference to FIG. 2. The video content metadata 25 "tags" the video content 26 with shareable, browseable, and searchable URLS that are accessible by both the local clients 16a, 16b and remote clients 24, as well as by external search engines 22, including a Web crawler 23 operating over the internetwork 19. Other local server functions and modules are possible.

Clients 16a, 16b can directly access the media platform 12 on the local server 11. Each client 16a, 16b respectively executes a media player 17a, 17b that provides end users with the capability of searching within the video content 26 being played, as further described below beginning with reference to FIG. 5. Other local client functions and modules are possible.

The media platform 12 and media players 17a, 17b, 25 together provide searching and marking features that facilitate usability and sharing. FIG. 2 is a functional block diagram showing a process flow 30 for the components of FIG. 1. The media platform 36 executes on the local server 11 and exports a set of Web services interfaces 43 through which a variety of operations 31 can be performed by users on the servers 11, 20, 22 and clients 16a, 16b, 24, as permitted by applicable permissions and restrictions.

Videos are a type of device-playable data that is a combination of both audio and video content. Specific locations within this content can be exposed for searching by external search engine 35, including Web crawling search engines, through media metadata 25 that includes media jots 27 and transcript snippets 28 stored in the transcription and metadata database 14. A media jot 27 is a title and description that is attached to specific sections within the video content 26. A transcript snippet 28 is a segment of transcript that is synchronized to specific sections within the video content 26. Both media jots 27 and transcript snippets 28 are maintained separately from the original video content 26, which is preferably left unmodified.

The media platform 36 exposes the media jots 27 and transcript snippets 28 in the transcription and metadata database 14 through the Web services interfaces 43 that enables the media jots 27 and transcript snippets 28 to be attached to Web-crawlable-and-indexable URLs. When an end user enters a search query using search terms or other searchable information, the media jots 27 and transcript snippets 28 allow the system to search for the terms and generate the search results to specific sections within the video content 26 in which the terms were found, as further described below with reference to FIG. 6. The media jots 27 and transcript snippets 28 can be searched in two ways. If site searching through an external search engine 35, such as a Web crawler, site map functionality 33 is exported and integrated into the external search engine 35. A site map list of the pages of a Web site accessible to Web crawlers or other Web search engines or to end users, which makes the metadata for the video content 26 available for search. Alternatively, a search application programming interface (API) 37 (operation 37) is exported by the Web services interfaces 43 of the media platform 36 for integrating searching of local video content 26, generally as stored in the local media storage 13 (shown in FIG. 1) with an existing site search 32 feature. The API can be integrated into an enterprise Web application platform, such as SharePoint, licensed by Microsoft Corporation, Redmond, Wash., or other customizable portals, to provide a complete Web search environment. These portals permit searching of documents, Web pages, and video content online through the media jots 27 and transcript snippets 28.

Additionally, in conjunction with the media platform 36, individual media players 33 implement search within (operation 38), table of contents (operation 39), and bookmarks (operation 40) features. End users are able to internally search, that is, search within, video content 26 during playback through their media players by browsing the media jots 27 and transcript snippets 28. As well, end users can browse a table of contents, click on a topic within the table of contents, and directly navigate to the location within the video content 26 indicated. The media player also allows end users to send hyperlinks to the sections within the video content 26. Finally, end users can temporally attach bookmarks to sections within video content 26 through their media player. The bookmarks are persisted across Web browser sections. Thus, end users can return to the video content 26 at a later time, click on a bookmark, and be returned to the same section.

Administrators are able to manage media (operation 41), particularly video content 26, through an administration console ("Admin Console") 34, which executes, for instance, as a Web application through the Web services interfaces 43 of the media platform 36. The administration console 34 is typically installed on the local server 11. Lastly, in a further embodiment, the Web services interfaces 43 include an analytics API (operation 42) that allow tracking of both site and video level analytics data. The site level analytics reports include top ten videos by view, top ten videos by duration, and viewing trends over a timeline. The video level analytics reports include top ten search terms, most popular topics, and bookmark usage data. Other analytics and reports are possible. Moreover, the analytics data can be integrated with conventional third party analytics software packages.

Figure 3:
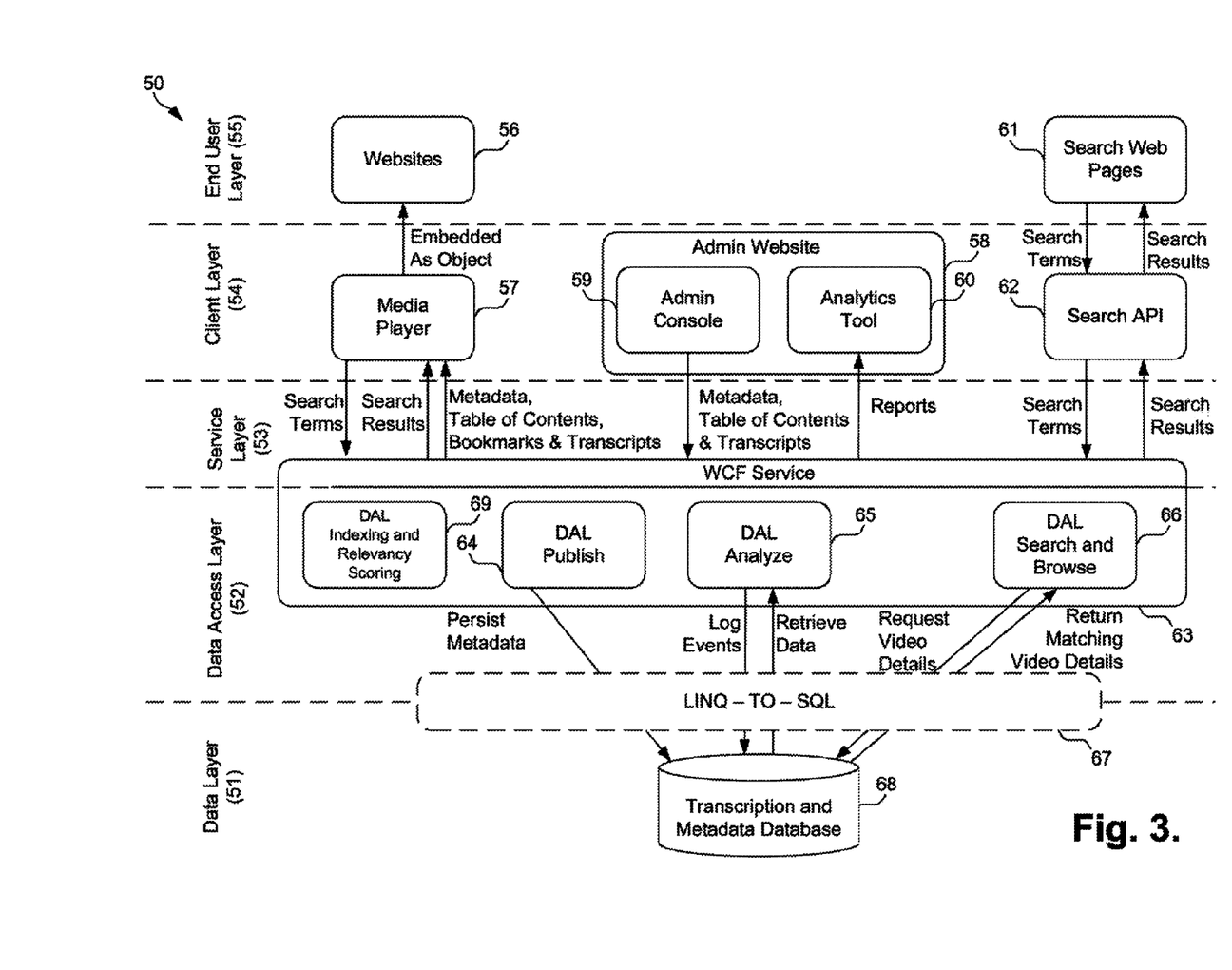
FIG. 3 is a block diagram showing an architectural view of the components of FIG. 1.

The suite of services provided through the media platform are implemented through a layered architecture. FIG. 3 is a block diagram showing an architectural view 50 of the components of FIG. 1. The three lowermost layers, data layer 51, data access layer 52, and service layer 53, are implemented in the media platform 12 on the local server 11 (shown in FIG. 1). The fourth layer up, client layer 54, is implemented functionally external to the local server 11 on different physical systems, as explained below, while the top layer, end user layer 55, is logically implemented through Web browsers executing on clients 16a, 16b, 24 and other systems. Other layered architectures are possible.

At the lowermost data layer 61, the transcription and metadata database 58 stores the media jots 27 and transcript snippets 28 independently of the actual video content 26, which is retained in original condition and stored in the local media storage 13 or remote media storage 22, although the media jots 27 and transcript snippets 28 could be integrated into the video content 26 directly. The transcription and metadata database 68 is implemented using SQL Server 2008, Enterprise Edition, licensed by Microsoft Corporation, Redmond, Wash. Other forms of structured relational databases could be used.

The next layer up, data access layer 52, interfaces to the transcription and metadata database 68 through a language integrated query ("LINQ")-to-SQL interface 67 that is implemented as a .NET Framework component, as licensed by Microsoft Corporation. The LINQ-to-SQL interface 67 defines a set of method names and translation rules that are used by four sets of services 63: data access layer ("DAL") publish 64, DAL analyze 65, DAL search and browse 66, and DAL indexing and relevancy scoring 69.

The next layer up, service layer 53, primarily interfaces the three sets of services 63 that make up the media platform 12 with applications executing on different physical systems, such as clients 16a, 16b, 24 (shown in FIG. 1) executing in the client layer 54. The service layer 53 is implemented through a Windows Communication Foundation ("WCF") service API, also implemented as a .NET Framework component for service-oriented applications. The services 63 interact with the applications in the client layer 54 through the service layer 53.

The DAL publish service 54 primarily interfaces with media players executing on clients 16a, 16b, 24. The DAL publish service 54 interfaces to the media players 57, which send video content 26 requests, including internal search queries that include search terms matching external queries. In response, the DAL publish service 54 executes the queries on the transcription and metadata database 68 by identifying markers in the metadata that match each query and sends search results back to the requesting media player 57, including metadata 25, table of contents data, bookmarks, and transcripts 24. Other types of requests and response data are possible. The DAL publish service 54 also persists metadata 25, particularly the media jots 27 and transcript snippets 28, to the transcription and metadata database 58 in the data layer 61. The metadata is provided through a searching and marking service, as described above with reference to FIG. 4.

The DAL analyze service 55 primarily interfaces to an administration Web site in the client layer 54 executing on the local server 11 as part of the media platform 12 (shown in FIG. 1). The administration Web site 58 provides a user interface to an administration console 59 and analytics tool 60. The administration console 59 sends metadata 25, particularly the media jots 27 and transcript snippets 28, table of contents data, and transcripts 24 to the DAL analyze service 55, which in turn are persisted to the transcription and metadata database 58 in the data layer 41 by the DAL publish service 64. The DAL analyze service 65 collects and logs events and related data concerning use of the video content 26 by other applications into the transcription and metadata database 58 and retrieves the events and related data for use in generating analytics reports that are provided to the analytics tool 60.

Finally, the DAL search and browse service 56 implements external and internal search functionality, respectively, through both site searching and the search API 62, which is part of the client layer 54. The search API 62 sends search terms to the DAL search and browse service 66 that originated from searches generated by Web search engines and the like. In turn, the DAL search and browse service 56 sends requests for video content 26 details to a database server for the transcription and metadata database 68. Video content 26 that the server matches is provided back to the search API 62 as search results. In a further embodiment, information about the video content 26, user, group, and so forth can be used to determine a relevancy score as part of the indexing process by the DAL indexing and relevancy scoring service 69, as further described below with reference to FIG. 4.

In the topmost end user layer 55, Web sites 56 are browsed using Web browser applications on clients 16a, 16b, 24, within which media players 57 execute. The media players 57 can be executed by personal computers, handheld and mobile devices, and other systems and devices capable of serving and playing Web content. Video content 26 is provided to the Web sites 56 as embedded objects. The media players 56 are compliant with the Silverlight Web application framework, licensed by Microsoft Corporation, although other Web application frameworks could also be used, such as QuickTime, licensed by Apple Inc., Cupertino, Calif., and Adobe Flash, licensed by Adobe Systems, Mountain View, Calif. As well, Web pages are searched 61 within the end user layer 55 by submitting search queries that include search terms to external search engines 22 (shown in FIG. 1) and through site searching front ends implemented using Web scripting interfaces, for example, Active Server Pages, licensed by Microsoft Corporation, or JavaScript, licensed by Netscape Communications Corporation, Mountain View, Calif.

Figure 4:
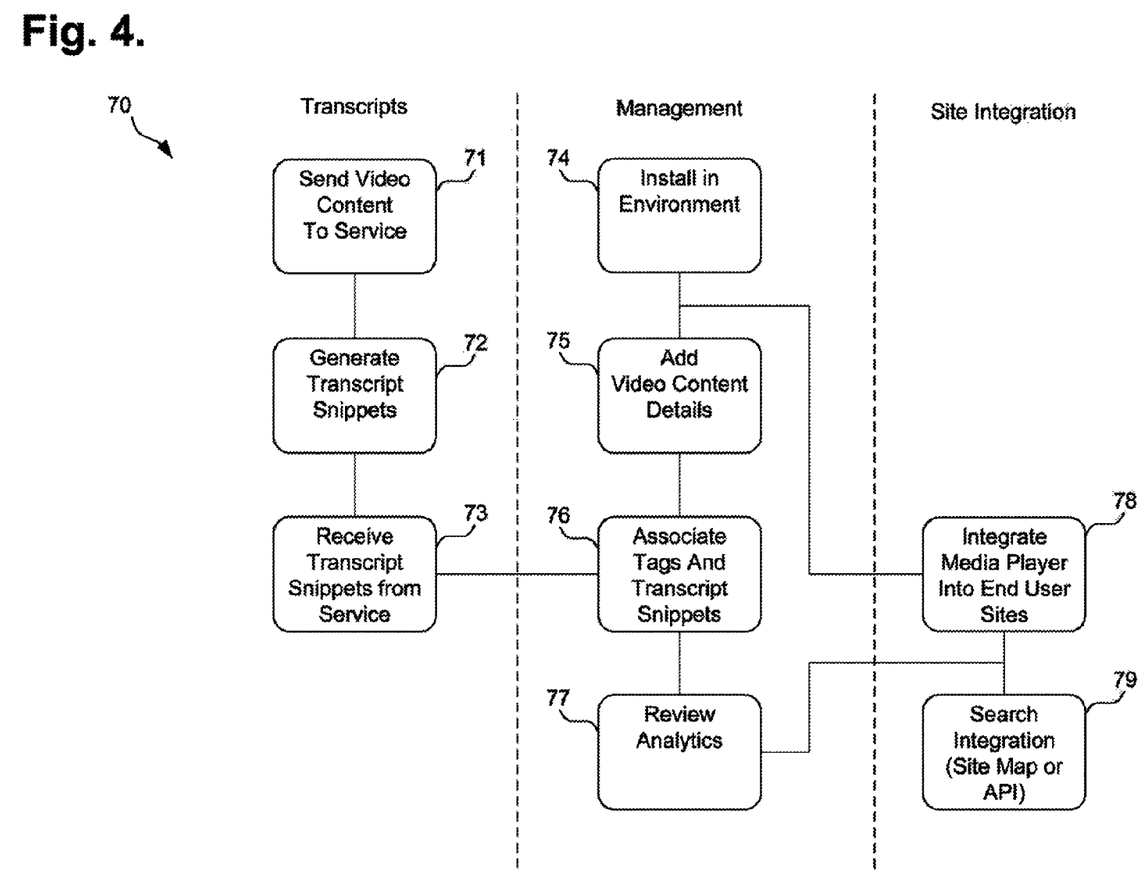
FIG. 4 is a flow diagram showing for providing searchable online media content.

Online media content, particularly video content 26, is provided with searching and marking features through a multi-step process. FIG. 4 is a flow diagram showing for providing searchable online media content 70. The steps are implemented in three stages that create transcripts (steps 71-73), manage video content 26 (steps 74-77), and integrate the video content 26 into Web sites (steps 78-79). The steps can overlap.

During the transcript creation stage, the video content 26 is first provided to the service (step 71), which transcribes any dialogue in the video content 26 and generates transcript snippets (step 72). The transcript snippets are stored in the transcription and metadata database (step 73).

During this stage, the video content 26 is indexed based on regularly updated data. In one embodiment, each type of available data concerning the video content 26 can be indexed, including any closed captions, transcripts, or metadata that is provided with the video content 26, as well as any user- or administrator-provided annotations and comments. In addition, information about the user is indexed, such as what chapter points, bookmarks, search terms, or videos they have searched, browsed, or watched, as well as what group, social cluster, demographic, or zip code-defined group they belong in and the videos which that group has watched. Multiple indexes can be used for different groups or individuals, or as needed for scaling, location, and architecture.

Referring back to FIG. 3, this regularly-updated information is used by the DAL indexing and relevancy scoring service 69. For each search, a relevancy score is calculated based on the foregoing regularly updated index data. The relevancy score can be used in various operations with the video content 26, including being displayed, stored, or made available through an API. In one embodiment, a relevancy edge scoring mechanism is used to tune the relevance in a search indexing engine, such as available in the Apache Lucene information retrieval software library, licensed by Apache Software Foundation, Forest Hill, Md., or the FAST ESP enterprise search product, formerly licensed by Fast Search & Transfer ASA, Oslo, Norway. Edge scoring is described in J. Sun et al., "Relevance Search and Anomaly Detection in Bipartite Graphs," SIGKDD Explorations, 7(2): 48-55 (Spec. Issue on Link Mining December 2005), the disclosure of which is incorporated by reference. Relevance tuning in a search indexing engine is described in J. Kumar, "Document Scoring/Calculating Relevance in Lucene," available at http://jayant7k.blogspot.com/2006/07/document-scoringcalculating-relevance_08.html (July 2006), and "Tune relevance factors (FAST Search Server 2010 for SharePoint)," available at http://technet.microsoft.com/en-us/library/ff453902.aspx (February 2011), the disclosures of which are incorporated by reference. The relevancy score can factor in the frequency of the search terms and other relevant business intelligence data. Based on the relevancy score, the search results can be ranked by relevancy to the applicable metric, such as user or group, and the most relevant search results can be returned in response to search queries of the video content 26.

Referring back to FIG. 4, during the management stage, the software components for the media platform are installed into the enterprise environment (step 74) and details regarding the video content 26 are added to the transcription and metadata database (step 75). The transcript snippets and any tags, that is, URLs that have been added to the video content 26, are associated with the original copy of the video content (step 76). Thereafter, in a further embodiment, analytics are generated and reviewed as the video content 26 is viewed (step 77).

Finally, during the site integration stage, the media players are installed into clients that execute at end user sites (step 78). As well, video content 26 search capabilities are integrated (step 79), whether using a site map or the search API.

Figure 5:
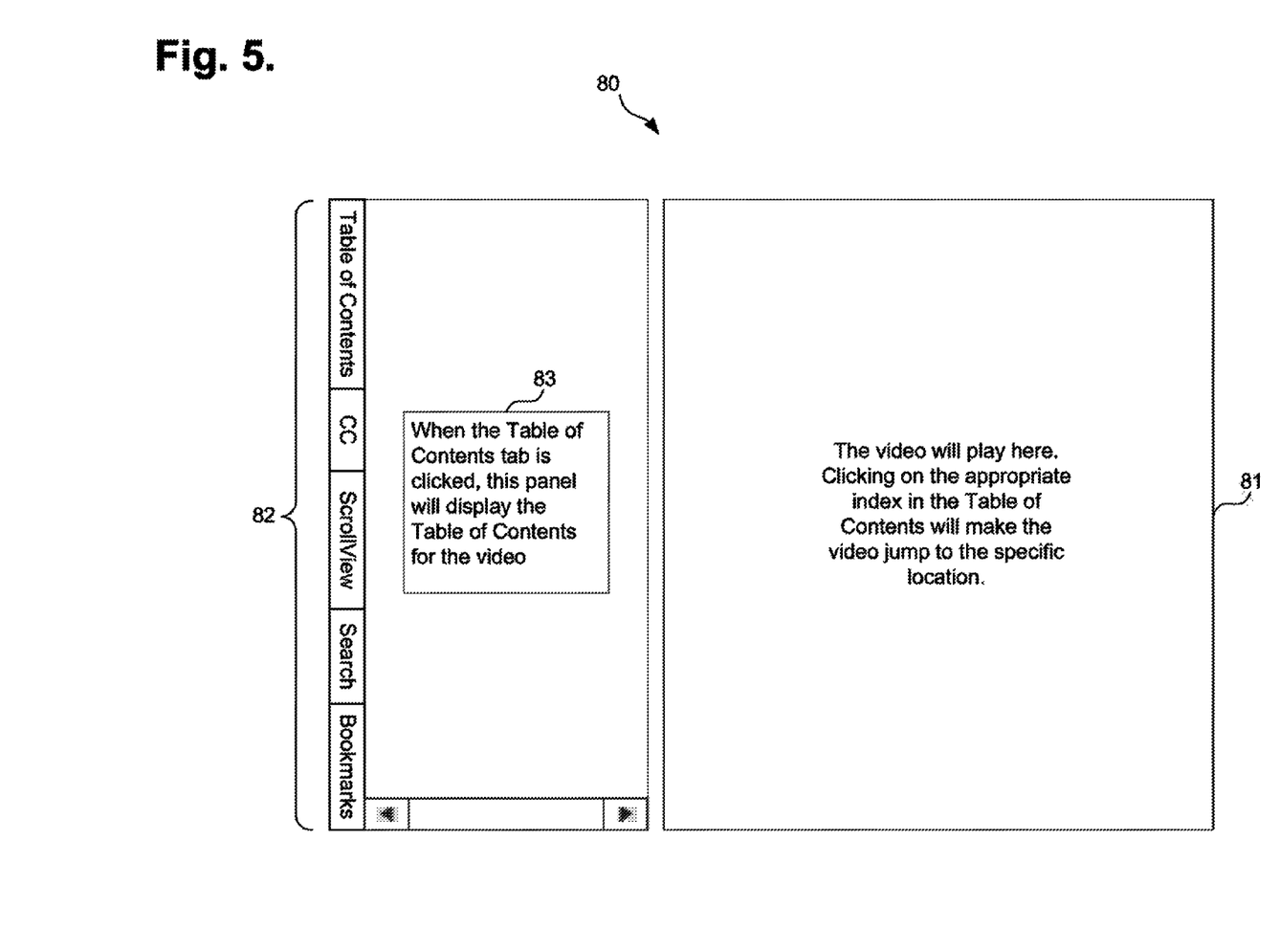
FIG. 5-7 are diagrams showing, by way of example, screen shots of a user interface presented by one of the clients of FIG. 1.
Figure 6:
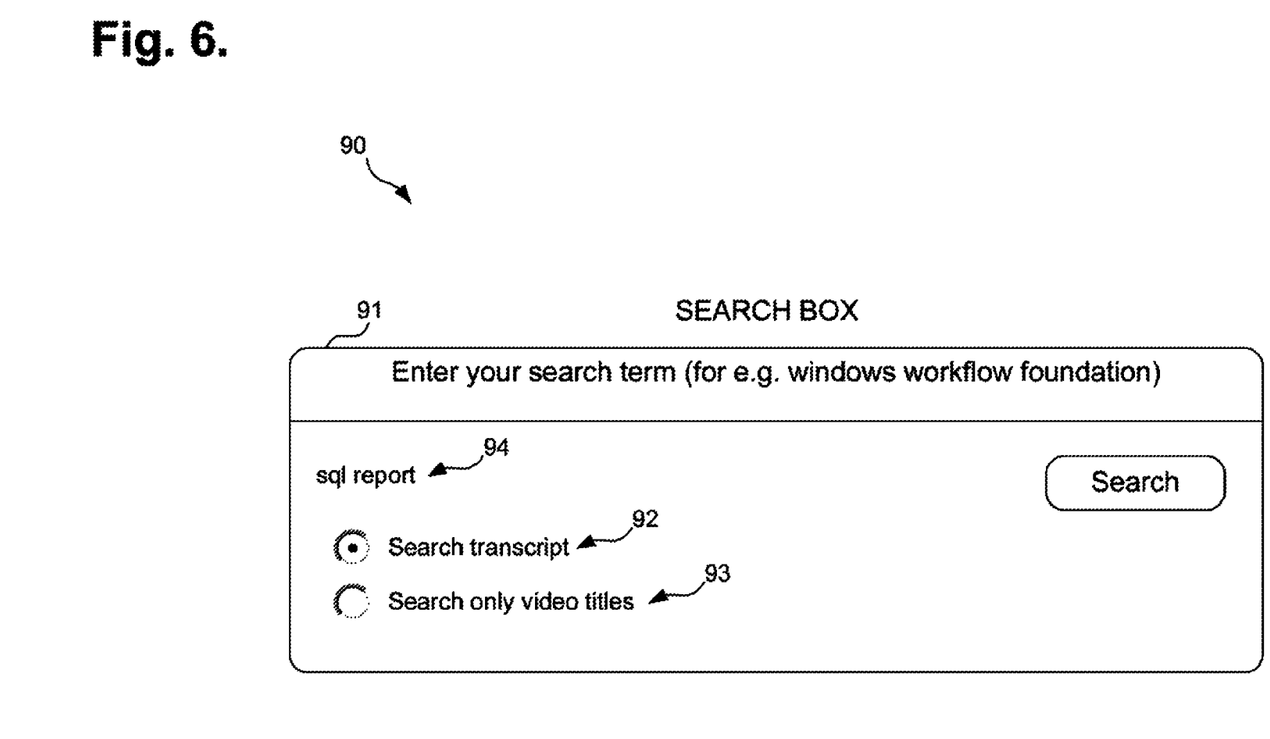
Figure 7:
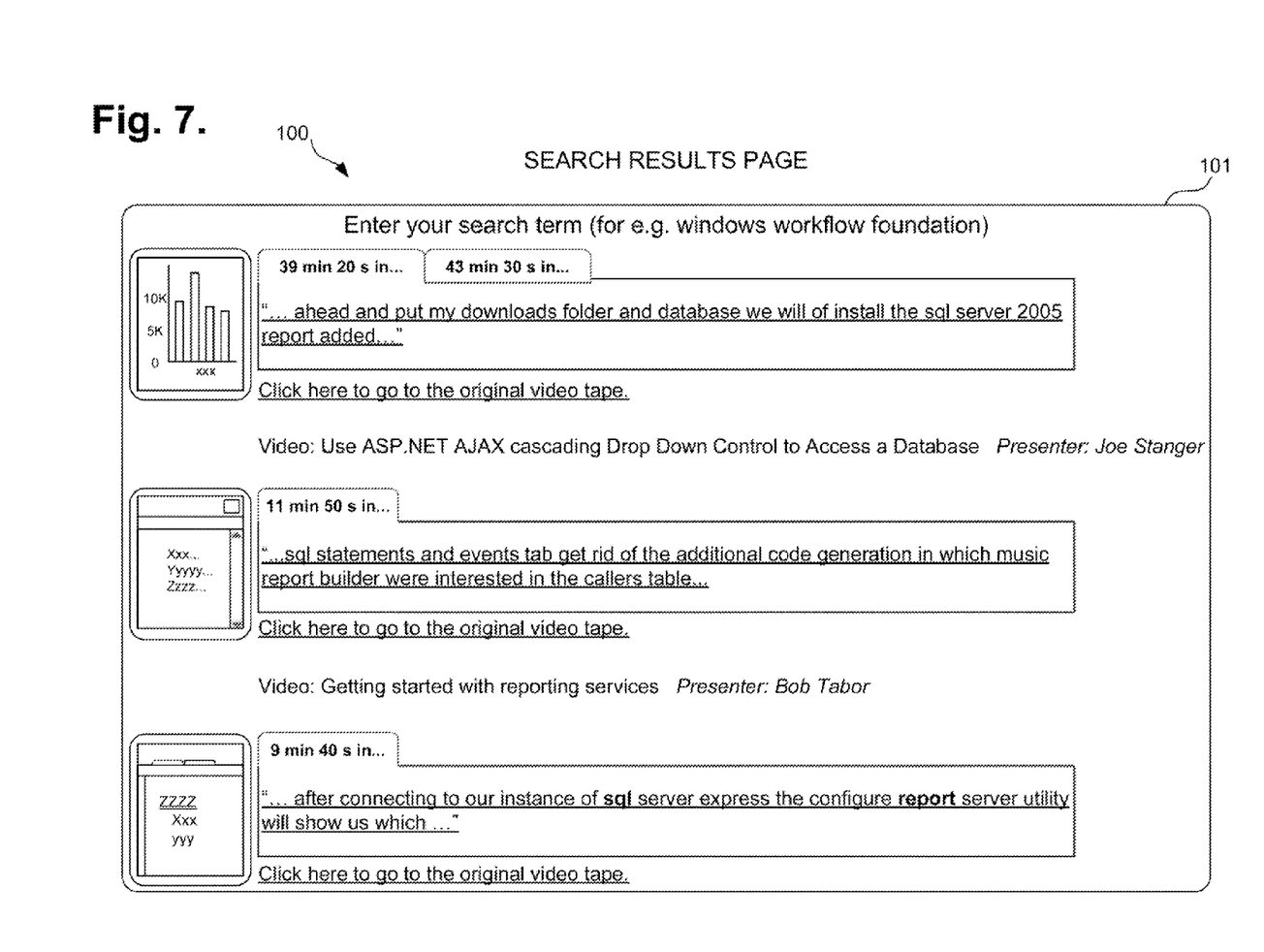

The end users viewing video content 26 through their media players are able to search within video content 26 being played and attach ad hoc bookmarks to sections within the video content 26. FIG. 5-7 are diagrams showing, by way of example, screen shots of a user interface presented by one of the clients of FIG. 1. Referring first to FIG. 5, an overall screen shot 80 of the view presented to an end user within a media player is shown. The video content 26 plays in a viewing area 81, while a menu of playing options 82 are presented, including a table of contents option that causes a table of contents for the video content 26 being played to be displayed 83. Additional features and their descriptions are provided in Tables 1 and 2.

TABLE 1

| Feature | Description |
| --- | --- |
| Player | Plays videos in formats supported by the framework, for instance, through use of Silverlight, licensed by Microsoft Corporation, QuickTime, licensed by Apple Inc., and Adobe Flash, licensed by Adobe Systems. |
| Table of Contents | Allows users to view a table of contents of the video, and click on an entry in the table of contents to skip the video to the given location. |
| Related Content | Allows administrators to add links to external documents to any table of content entry. Allows users to follow these links in a new browser tab or window. |
| Custom Start Point | The player reads information in the URL query string and also the object initialization parameters and skips to the appropriate point in the video. This feature allows external sources to link directly to segments within a video, rather than depending on the mechanisms in the player itself. |
| Link Sharing | The player can generate the links used for custom start points, enabling users to easily share a specific part of a video with other users. This link can be placed in a new email by the player, depending on settings. |
| Search Within | Allows users to use a familiar text search on the contents of a video that is currently being viewed. This feature searches the table of contents (both the title and larger text description of each entry), along with the transcript of the video, if available. |
| Bookmarks | Users can bookmark a certain point within a video. This feature is stored across browser sessions, so a user can resume where they left off, or save important or favorite video clips for later reference and viewing. |
| Closed Captions | If closed captioning data is available, the closed captioning data can be displayed along the bottom of the video at the viewer's discretion. |
| Full-Screen Viewing | Videos can be displayed in full-screen. |

TABLE 1-continued

| Feature | Description |
| --- | --- |
| Search | A custom API is provided for retrieving search results from multiple videos. These search results can be integrated with text-based search results, allowing end users to search the contents of videos right alongside searching text, HTML, and documents. With Custom Start Points, search results can link not just to the right video, but the right place in the right video. |
| Analytics | The player gathers useful data on how the video content 26 is used, which can be used by the Analytics Tool 34 (shown in FIG. 2), or can be used with other analytics systems, such as Google Analytics. |
| Flexible Player | The player dimensions are not rigid and can be modified in HTML to fit the size of video being played or the space available on the Web page. |
| Admin Editor | An easy-to-use user interface for creating tables of contents for videos. Simply navigate to the place in the video where you would like to create a table of contents entry, and click "Add." |
| Metadata Editor | A simple form for adding or editing metadata for a video, which can include any tags for the video that could help inform search results, title and description of the video, and a place to upload transcript data for a video. |
| Analytics | View analytics data collected by the player, such as most popular videos by number of times that they have been started, total amount of time they have been viewed, or how many bookmarks users create for them. Find underperforming servers by seeing which videos spend the most time buffering, what search terms people are using, both on a particular Web site and within each video, which table of contents entries are most popular per video, and other information. |
| Video Management | More than one site or catalog of videos can be hosted by the system. As well, each video can belong to one or more sites. Searching and browsing of videos can be limited to certain sites based on where the search is run, what credentials the user has, or other criteria. |
| User Management | The admin console 34 (shown in FIG. 2) allows management of administrative accounts directly from the Web site, which can include creating new users, adding or removing permissions, changing contact details, and so forth. |
| Search Crawler Enabler | A single file, named sitemap.xml, can be added to expose the contents within the videos on the site to search engines, allowing users to reach points within the video content 26 in a single click on their external search engine's search results page. |
| Preview Mode | Mark certain videos as being for preview only, such that users will only be able to watch the 30 seconds of video beginning where they started (either the beginning of the video or from a Custom Start Point). |

TABLE 2

| Feature | Description |
| --- | --- |
| Timeline Highlights | When viewing a set of locations within a video, for instance, a table of contents, search results, or bookmarks, the location of results is highlighted on the video timeline. |
| Live Transcripts | The transcript of a video is displayed to the user. Clicking on a word or phrase in the transcript skips to the corresponding portion of the video. |
| User Comments | Allows users to comment on a video. Comments can be attached to specific times within a video. |
| Notifications | Allows content owners to add text overlays to video. Useful for correcting errors made by the speaker, updating statistics in older videos, or giving some context to viewers who may need additional information. |
| Similar Videos | Recommendations of heuristically-determined similar videos that may appeal to the user. |
| User Ratings | Users may give a rating to videos, for instance, one to five stars, where five stars is tops. |
| Tag Cloud | Shows the most commonly used words in a video, ordered alphabetically, but sizing more frequently used words larger than less frequently used words. Clicking on one of these words begins a search within the video for places where the word is used. |
| URL Rewriting | Support for friendlier URLs, for instance, example.com/videos/My-Awesome-Video/Best-part-right-here/, rather than example.com/videos/play.aspx?vid=284&iid=9238. |
| Enhanced Security | Protect content by only allowing certain clips within a video to be played by unauthorized users, there by allowing anonymous users to sample a video before purchase. |
| Preview Picture | Optionally display a single image preview as a placeholder before the video is played. |
| Thumbnails | Associate thumbnail images to table of contents entries. These thumbnails can be displayed anywhere in table of content entries that are displayed, for instance, Contents menu, SearchWithin search results, and so forth. |

Referring next to FIG. 6, a screen shot 90 of a search box 91 is shown, such as presented when searching for video content 26 through a site map or the search API. The end user selects a type of search, for instance, full transcript search 92 or a search limited to video titles only 93, and also specifies search query terms 94. Finally, referring to FIG. 7, a screen shot 100 of a search results page 101 is shown. Upon execution, the search query is processed against the media metadata 25 stored in the transcription and metadata database 14 and the video content 26 responsive to the search query terms are provided as search results. To further assist the end user, context can be added to each search result, such as provided through media jots 27 and transcript snippets 28. Other types of search result context could also be provided.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for providing searchable online media content, comprising:
a data store maintained through a media server that is accessible online over a data communications network, comprising:
media content comprising device-playable data provided for dynamic online use through remote streaming over the network;
transcript snippet comprising a segment of transcript that is synchronized to a specific section within the device-playable data;
media jot comprising and annotating a title and description for the specific section of the device-playable data; and
media metadata stored independently from the media content comprising the synchronized transcript snippets and the annotated media jots;
a media platform functionally combining the media content and the media metadata through a layered network architecture, comprising the data store as a data layer of the network architecture, applications provided within a client layer of the network architecture that execute on a client interconnected to the network, and service interfaces provided within a data access layer of the network architecture, which are each accessible by at least one of the applications; exposing the synchronized transcript snippets and the annotated media jots for the specific section of the device-playable data; and tagging a Uniform Resource Locator (URL) accessible by the client to the specific section of the device-playable data;

a publish service interface within the data access layer receiving a search query for the media content from the applications in the client layer; identifying one or more of the transcript snippets and the media jots in the media metadata that match the search query; combining the media content and the media metadata in response to the match of the identified transcript snippets and the media jots with the search query through a service interface from one of the applications; sending one or more search results as combinations of the media content and the media metadata in response to the search query to the applications in the client layer, the search results comprising the specific sections of the device-playable data synchronized to the identified transcript snippets; and displaying to the client the search results as at least one portion of each transcript of the device-playable data, the displayed transcript comprising one such specific section of the device-playable data directly linked through the URL.

2. A computer-implemented system according to claim 1, further comprising:
an analyze service interface within the data access layer receiving media metadata from an administration console application in the client layer through the analyze service interface; collecting and logging events and related data concerning use of the video content to the data store; and sending events and related data to an analytics application in the client layer through the analyze service interface.

3. A computer-implemented system according to claim 2, further comprising at least one of:
a Web analytics module providing the events and related data as Web site-level analytics data comprising one or more of top media content selections by view, top media content selections by duration, and media content viewing trends over a timeline; and
a selection analytics module providing the events and related data as media content selection-level analytics data comprising one or more of top search terms, most popular topics, and bookmark usage data.

4. A computer-implemented system according to claim 1, further comprising:
an indexing and relevancy scoring service interface within the data access layer accessing regularly-updated data concerning the media content; determining a relevancy score based on the regularly-updated data for each of the search query; and ranking the search results based on the relevancy score.

5. A computer-implemented system according to claim 4, further comprising at least one of:
data concerning the media content one or more of closed captions, transcripts, and metadata;
data concerning the media content one or more of user- or administrator-provided annotations and comments;
data concerning the media content one or more of what chapter points, bookmarks, search terms, or media content users have searched, browsed, or watched; and
data concerning the media content one or more of what group, social cluster, demographic, or zip code-defined group users belong in and the media content which that group has used.

6. A computer-implemented system according to claim 1, further comprising at least one of:
a site map external search module performing external searching of the media content to Web search engines by providing a site map comprising a list of Web pages for the media metadata; and
an application programming external search interface performing external searching of the media content to Web search engines by exporting a search application programming interface comprised of a search and browse service for the media metadata.

7. A computer-implemented system according to claim 1, further comprising at least one of:
a browser search module performing internal searching of the media content to media player applications by providing browsing of the media metadata;
a table of contents search module performing internal searching of the media content to media player applications by providing browsing of a table of contents comprised with the media content; and
a bookmarks search module performing internal searching of the media content to media player applications by providing browsing of bookmarks temporally set within the media content.

8. A computer-implemented system according to claim 1, wherein the media content comprises at least one of video content, audio media, and visual media.

9. A computer-implemented method for providing searchable online media content, comprising:
maintaining a data store through a media server that is accessible online over a data communications network, comprising:
storing media content comprising device-playable data provided for dynamic online use through remote streaming over the network;
obtaining transcript snippets, each transcript snippet comprising a segment of transcript that is synchronized to a specific section within the device-playable data;
obtaining media jots, each media jot comprising and annotating a title and description for the specific section of the device-playable data;
storing media metadata independently from the media content comprising the synchronized transcript snippets and the annotated media jots; and
exposing the synchronized transcript snippets and the annotated media jots for the specific section of the device-playable data and tagging a Uniform Resource Locator (URL) accessible by the client to the specific section of the device-playable data;
functionally combining the media content and the media metadata through a layered network architecture, comprising:
providing the data store as a data layer of the network architecture;
providing applications within a client layer of the network architecture that execute on a client interconnected to the network; and
providing service interfaces within a data access layer of the network architecture, which are each accessible by at least one of the applications;
receiving a search query for the media content from the applications in the client layer;
identifying one or more of the transcript snippets and the media jots in the media metadata that match the search query;
combining the media content and the media metadata in response to the match of the identified transcript snippets and the media jots with the search query through a service interface from one of the applications;
sending one or more search results as combinations of the media content and the media metadata in response to the search query to the applications in the client layer, the search results comprising the specific sections of the device-playable data synchronized to the identified transcript snippets; and displaying to the client the search results as at least one portion of each transcript of the device-playable data, the displayed transcript comprising one such specific section of the device-playable data directly linked through the URL.

10. A computer-implemented method according to claim 9, further comprising:

exporting an analyze service interface within the data access layer, comprising:

receiving media metadata from an administration console application in the client layer through the analyze service interface;

collecting and logging events and related data concerning use of the video content to the data store; and sending events and related data to an analytics application in the client layer through the analyze service interface.

11. A computer-implemented method according to claim 10, further comprising at least one of:

providing the events and related data as Web site-level analytics data comprising one or more of top media content selections by view, top media content selections by duration, and media content viewing trends over a timeline; and providing the events and related data as media content selection-level analytics data comprising one or more of top search terms, most popular topics, and bookmark usage data.

12. A computer-implemented method according to claim 9, further comprising:

exporting an indexing and relevancy scoring service interface within the data access layer, comprising:

accessing regularly-updated data concerning the media content;

determining a relevancy score based on the regularly-updated data for the search query; and ranking the search results based on the relevancy score.

13. A computer-implemented method according to claim 12, further comprising at least one of:

including in the data concerning the media content one or more of closed captions, transcripts, and metadata;

including in the data concerning the media content one or more of user- or administrator-provided annotations and comments;

including in the data concerning the media content one or more of what chapter points, bookmarks, search terms, or media content users have searched, browsed, or watched; and including in the data concerning the media content one or more of what group, social cluster, demographic, or zip code-defined group users belong in and the media content which that group has used.

14. A computer-implemented method according to claim 9, further comprising at least one of:

performing external searching of the media content to Web search engines by providing a site map comprising a list of Web pages for the media metadata; and performing external searching of the media content to Web search engines by exporting a search application programming interface comprised of a search and browse service for the media metadata.

15. A computer-implemented method according to claim 9, further comprising at least one of:

performing internal searching of the media content to media player applications by providing browsing of the media metadata;

performing internal searching of the media content to media player applications by providing browsing of a table of contents comprised with the media content; and performing internal searching of the media content to media player applications by providing browsing of bookmarks temporally set within the media content.

16. A computer-implemented method according to claim 9, wherein the media content comprises at least one of video content, audio media, and visual media.

17. A computer-implemented apparatus for providing searchable online media content, comprising:

means for maintaining a data store through a media server that is accessible online over a data communications network, comprising:

means for storing media content comprising device-playable data provided for dynamic online use through remote streaming over the network;

means for obtaining transcript snippets, each transcript snippet comprising a segment of transcript that is synchronized to a specific section within the device-playable data;

means for obtaining media jots, each media jot comprising and annotating a title and description for the specific section of the device-playable data;

means for storing media metadata independently from the media content comprising the synchronized transcript snippets and the annotated media jots; and means for exposing the synchronized transcript snippets and the annotated media jots for the specific section of the device-playable data and tagging a Uniform Resource Locator (URL) accessible by the client to the specific section of the device-playable data;

means for functionally combining the media content and the media metadata through a layered network architecture, comprising:

means for providing the data store as a data layer of the network architecture;

means for providing applications within a client layer of the network architecture that execute on a client interconnected to the network; and means for providing service interfaces within a data access layer of the network architecture, which are each accessible by at least one of the applications;

means for receiving a search query for the media content from the applications in the client layer;

means for identifying one or more of the transcript snippets and the media jots in the media metadata that match the search query;

means for combining the media content and the media metadata in response to the match of the identified transcript snippets and the media jots with the search query through a service interface from one of the applications;

means for sending one or more search results as combinations of the media content and the media metadata in response to the search query to the applications in the client layer, the search results comprising the specific sections of the device-playable data synchronized to the identified transcript snippets; and means for displaying to the client the search results as at least one portion of each transcript of the device-playable data, the displayed transcript comprising one such specific section of the device-playable data directly linked through the URL.

* * * * *